US009630539B2

United States Patent
Yokoyama et al.

(10) Patent No.: US 9,630,539 B2
(45) Date of Patent: Apr. 25, 2017

(54) VEHICLE SEATS

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Satoshi Yokoyama, Aichi-ken (JP); Keisuke Yamamoto, Aichi-ken (JP); Tomohiro Muramatsu, Aichi-ken (JP); Kazuyuki Shiga, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/654,775

(22) PCT Filed: Dec. 17, 2013

(86) PCT No.: PCT/JP2013/084396
§ 371 (c)(1),
(2) Date: Jun. 22, 2015

(87) PCT Pub. No.: WO2014/103976
PCT Pub. Date: Jul. 3, 2014

(65) Prior Publication Data
US 2015/0343930 A1    Dec. 3, 2015

(30) Foreign Application Priority Data

Dec. 27, 2012 (JP) ................................ 2012-284754

(51) Int. Cl.
*A47C 7/02*    (2006.01)
*B60N 2/68*    (2006.01)
(Continued)

(52) U.S. Cl.
CPC ................ *B60N 2/68* (2013.01); *B60N 2/04* (2013.01); *B60N 2/3045* (2013.01)

(58) Field of Classification Search
CPC ...... B60N 2/68; B60N 2/3045; B60N 2/3047; B60N 2/14; B60N 2/682
(Continued)

(56) References Cited

U.S. PATENT DOCUMENTS 3,161,436 A     12/1964  Hood
3,531,552 A *   9/1970   Getz ........................ A47C 7/18
                                                        264/45.3
(Continued)

FOREIGN PATENT DOCUMENTS

CN    202463635    10/2012
EP    0386890      9/1990
(Continued)

OTHER PUBLICATIONS

International Search Report for PCT/JP2013/084396 dated Apr. 7, 2014.
(Continued)

*Primary Examiner* — Laurie K Cranmer
(74) *Attorney, Agent, or Firm* — Greenblum & Bernstein, P.L.C.

(57) ABSTRACT

A tiltable vehicle seat has a seat frame, a pad formed in a mold associated with the seat frame and a bracket attaching a seatback to the seat frame. The pad is formed through foaming to expand and engulf the seat frame and is integrated with the seat frame. The bracket allows for the seat frame and the pad contained therein to be tilted relative to the seatback to provide multiple vehicle seat modes. The bracket is formed separately from the seat frame and attached to the seat frame thus allowing for the pad to be formed from a relatively compact mold.

11 Claims, 6 Drawing Sheets

(51) Int. Cl.
  *B60N 2/30* (2006.01)
  *B60N 2/04* (2006.01)
(58) Field of Classification Search
  USPC ... 297/452.48, 452.18, 452.2, 452.6, 452.61, 297/452.17
  See application file for complete search history.

(56) References Cited

U.S. PATENT DOCUMENTS

| | | | | |
|---|---|---|---|---|
| 3,844,614 | A * | 10/1974 | Babbs | B60N 2/7041 |
| | | | | 297/452.2 |
| 4,534,595 | A * | 8/1985 | Abe | B60N 2/5875 |
| | | | | 297/452.61 |
| 4,609,226 | A * | 9/1986 | Yoshizawa | A47C 7/18 |
| | | | | 297/452.6 |
| 4,699,427 | A * | 10/1987 | Kobayashi | B29D 99/0092 |
| | | | | 297/452.27 |
| 4,796,954 | A * | 1/1989 | Saito | B60N 2/68 |
| | | | | 297/452.2 |
| 5,000,515 | A | 3/1991 | Deview | |
| 5,142,757 | A * | 9/1992 | Thary | B29C 44/0461 |
| | | | | 264/46.6 |
| 5,437,498 | A * | 8/1995 | Waelde | B60N 2/449 |
| | | | | 297/452.2 |
| 5,609,395 | A * | 3/1997 | Burch | A47C 7/42 |
| | | | | 297/335 |
| 5,988,756 | A * | 11/1999 | Aufrere | B60N 2/68 |
| | | | | 297/391 |
| 6,286,902 | B1 | 9/2001 | Yoshimura | A47C 7/40 |
| | | | | 297/452.18 |
| 6,322,148 | B1 * | 11/2001 | Kolena | B60N 2/682 |
| | | | | 297/354.12 |
| 6,769,146 | B2 * | 8/2004 | Copeland | B60N 2/58 |
| | | | | 297/452.61 |
| 7,690,732 | B2 * | 4/2010 | Olarte | A47C 7/282 |
| | | | | 297/248 |
| 8,091,945 | B2 * | 1/2012 | Hancock | B60N 2/3011 |
| | | | | 296/65.06 |
| 8,528,981 | B2 * | 9/2013 | Funk | B29C 44/18 |
| | | | | 297/216.1 |
| 8,998,309 | B2 * | 4/2015 | Galbreath | B60N 2/70 |
| | | | | 264/46.4 |
| 2007/0210638 | A1 * | 9/2007 | Adragna | B60N 2/68 |
| | | | | 297/452.2 |
| 2009/0289491 | A1 * | 11/2009 | Nakagaki | B60N 2/686 |
| | | | | 297/452.2 |
| 2011/0006581 | A1 * | 1/2011 | Funk | B29C 44/18 |
| | | | | 297/452.48 |

FOREIGN PATENT DOCUMENTS

| | | |
|---|---|---|
| FR | 2845325 | 4/2004 |
| JP | 59-164120 | 9/1984 |
| JP | 7-61270 | 3/1995 |
| JP | 2005-212554 | 8/2005 |
| JP | 2008-155724 | 7/2008 |
| JP | 2010-149819 | 7/2010 |

OTHER PUBLICATIONS

Written Opinion of the International Searching Authority for PCT/JP2013/084396 dated Apr. 7, 2014.
International Preliminary Report on Patentability for PCT/JP2013/084396 dated Dec. 5, 2014.
Japanese Office Action for JP App. No. 2012-284754 mailed on May 17, 2016, along with English-language translation thereof.
Chinese Office Action for CN App. No. 201380067577.8 mailed on Apr. 25, 2016, along with English-language translation thereof.

* cited by examiner

PRIOR ART

PRIOR ART

VEHICLE SEATS

CROSS-REFERENCE TO RELATED APPLICATIONS

The present application is a National Phase entry of, and claims priority to, PCT Application No. PCT/JP2013/084396, filed Dec. 17, 2013, which claims priority to Japanese Patent Application No. 2012-284754, filed Dec. 27, 2012, both of which are incorporated herein in their entireties by reference.

FIELD OF THE INVENTION

The present invention generally relates to a tiltable vehicle seat. More specifically, the vehicle seat has, for example, a seat frame and a pad inserted and mounted therein. Moreover, the seat frame has a bracket for adjusting a seat position and/or mode of the seat by, for example, an occupant inside a vehicle. The pad is formed through foaming so as to cover the seat frame and as to be integrated with the seat frame.

BACKGROUND INFORMATION

As generally understood and referred to in the art, a passenger and/or commercial vehicle, such as a van and/or a sport utility vehicle (i.e. a "SUV"), may be adapted to include multiple rows of seating to allow for the convenient transportation of multiple passengers. Such an automobile includes two or three rows of vehicle seats arranged in a series in the longitudinal direction of the automobile. A seat located in the first, foremost row may be referred to as "a front seat". Likewise, a seat located in the second row of seating behind the first row of seating may be referred to as "a second seat", and a seat in the third row is referred to as "a third seat". Moreover, the second seat may be manufactured to permit an occupant of the second seat to adjust the position and/or mode of the second seat while inside the vehicle. For example, Japanese Laid-Open Patent Publication No. 2010-149819 discloses a seat with a "walk-in mode" and a "fully tilted" mode as examples of the seat adjustments. In the walk-in mode, a seat back is maintained in a forwardly inclined position. In the fully tilted mode, the seatback overlaps a seat cushion. As a result, an occupant can easily get into and out of the third seat. Alternatively, an effective space of a vehicle interior is enlarged.

A cushion frame of the seat cushion has right and left side frames. The side frames have protruding brackets for performing adjustments to the walk-in mode and the fully tilted mode. The protruding brackets are bent in a boomerang-like fashion in the vicinity of the seat back and protrude from the seat cushion.

Instead of the walk-in mode and the fully tilted mode, the second seat may be adjusted to a tip-up mode. In the tip-up mode, the seat cushion is flipped up so as to be parallel with and/or overlap with the seatback. As in a technique disclosed in Japanese Laid-Open Patent Publication No. 2010-149819, the seat has a bracket 230 as shown in FIG. 7. The seat cushion of a rear seat 201 has a cushion frame 202a equipped with a substantially U-shaped front frame 210. Brackets 230 are provided at both sides of the front frame 210 in the vicinity of the seatback. The brackets 230 protrude while bent in a boomerang-like fashion.

As shown in FIGS. 8 and 9, a pad 220 containing cushion frame 202a is formed through foaming. The size of a mold (not shown) for the pad 220 is determined so as to allow for the installation of brackets 230. This results in an increase in the size of the mold. The mold is larger than, for example, a mold for a construction in which the cushion frame has no brackets 230. The construction does not allow for an adjustment, for example, to the walk-in mode, the fully tilted mode, and the tip-up mode because the construction has no brackets 230. Continuing with that currently available, EP0386890 A1 generally discloses a vehicle seat having a seat frame, a pad integrated with the seat frame where the pad may be formed through foaming to cover the seat frame and a bracket configured to adjust a seat mode of a seat mounted within a vehicle. In detail, the bracket may be formed separately from the seat frame to be mounted to the seat frame after the foaming of the pad. Similar to that discussed above, U.S. Pat. No. 3,161,436 generally discloses a cushioning element, such as a pad, used in a vehicle seat and so on where the cushioning element has a seat frame and a pad integrated with the seat frame. In detail, the pad may be formed through foaming so as to cover the seat frame. Moreover, FR2845325 A1 discloses a vehicle seat having a seat cushion, a seatback and a bracket for rotatably connecting the seat cushion and the seatback.

Thus, there is a need for a vehicle seat which allows for adjustments inside the vehicle, as mentioned above, and which may have a pad that may be formed from a relatively small mold about a seat frame through foaming. Resultantly, the pad may integrate with and/or cover a seat frame of the seat.

SUMMARY

According to an aspect of the present application, a vehicle seat has a seat frame and a pad. The pad is integrated with the seat frame and is formed through foaming so as to cover at least a portion of the seat frame. The seat frame has a bracket for adjusting a seat mode within a vehicle. The bracket is formed separately from the seat frame, and is mounted to the seat frame after foaming of the pad.

Through operation of the bracket, the vehicle seat can be adjusted to a tip-up mode, etc. After the foaming of the pad in a mold, the bracket is mounted to the seat frame. Thus, there is no need for a mold whereby the size taking of the bracket must be taken into consideration. Therefore, the mold can be reduced in size.

According to another aspect of the present application, the seat may be adjusted to the tip-up mode. The seat frame may include a cushion frame of a seat cushion. The bracket may have a curved shape. An end portion of the bracket may be provided at an end portion of a lower frame of a back frame and may be rotatably connected to the cushion frame. As a result, the vehicle seat can be adjusted to the tip-up mode.

According to still another aspect of the present application, the seat frame may be fabricated without protruding from a pad of the seat. Thus, the seat frame, which is a hard object, is not exposed to the outside of the pad. Thus, the user seated on the seat doesn't feel anything unpleasant.

DETAILED DESCRIPTION OF EMBODIMENTS

Figure 1:
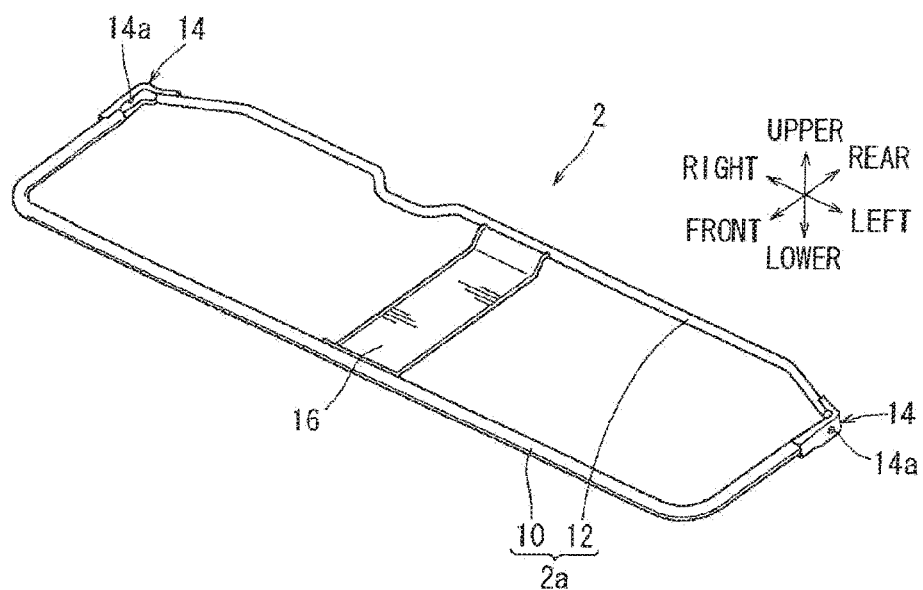
FIG. 1 is a perspective view of a cushion frame of the present invention.

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

An embodiment of the present invention will be described with reference to FIGS. 1 to 3. A vehicle seat is, for example, a rear seat 1 of an automobile. In the drawings, the directional orientations of upper, lower, front, rear, right, and left are shown relative to an instance where the rear seat 1 has been mounted in the automobile (not shown). These directions are also applied in FIGS. 4 to 6.

The rear seat 1 has a seat cushion 2 and a seatback 3. The rear seat 1 can be adjusted to a tip-up mode. When manufacturing the rear seat 1, the seat cushion 2 and the seatback 3 are first manufactured individually. The seat cushion 2 and the seatback 3 are connected to each other by brackets 30.

Figure 2:
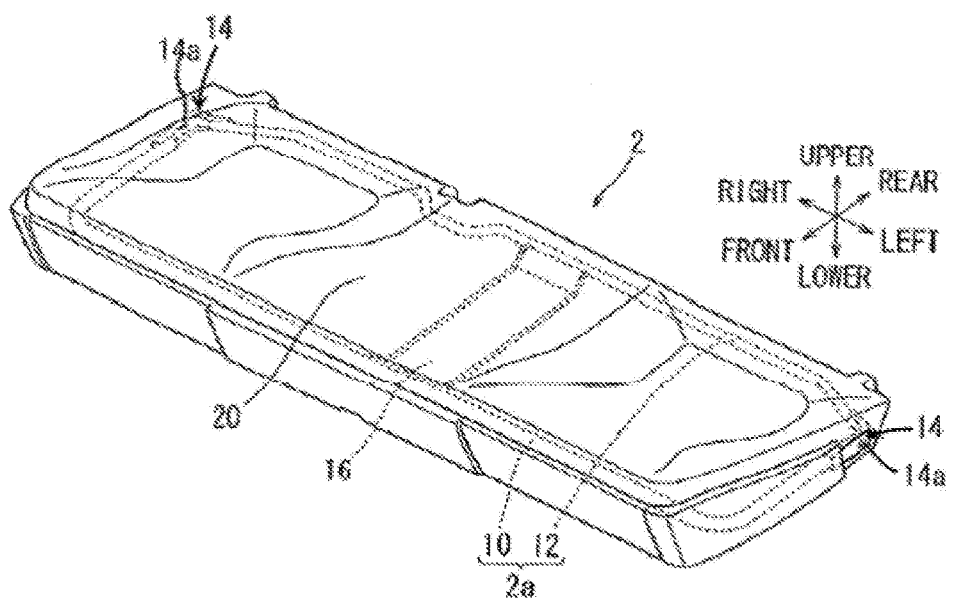
FIG. 2 is a perspective view of a seat cushion having a body of foamed beads integrated with the cushion of FIG. 1.

As shown in FIGS. 1 and 2, the seat cushion 2 has a cushion frame 2a, a pad (a body of foamed beads/cushion material) 20, a cushion pad (not shown in the FIGS.), and a cushion cover (not shown in the FIGS.). The cushion frame 2a defines a framework of the seat cushion 2. The pad 20 is made by foaming beads so as to integrate and/or couple with the cushion frame 2a and cover at least a part of the cushion frame 2a. The cushion pad is mounted so as to engulf the pad 20. The cushion cover covers at least a portion of a surface of the cushion pad.

As shown in FIG. 1, when manufacturing the seat cushion 2, the cushion frame 2a is formed first. The cushion frame 2a has a substantially U-shaped front frame 10, and a rear frame 12 bridging both ends of the front frame 10. The cushion frame 2a is constructed to avoid protruding from the pad 20 after foaming. The ends of the front frame 10 and the ends of the rear frame 12 are bonded by connection members 14. Each connection member 14 has a mounting hole 14a to which a bracket 30 is mounted using a bolt B.

Next, the cushion frame 2a is set in the cavity (not shown in the FIGS.) of a mold (not shown in the FIGS.). The cavity is shaped such that the pad 20 assumes a desired shape (seat shape) after being formed by foaming.

Foamable liquid is powered into the cavity and foamed in the mold to make the pad 20. Before the foamable liquid is poured into the cavity, the cushion frame 2a is set in the cavity. The mold has a restriction portion to prevent the foamable liquid from entering the mounting holes 14a of the connection members 14. As a result, even when the cushion frame 2a is covered with the pad 20, the mounting holes 14a can be exposed.

The foamable liquid is poured into the cavity and foamed in the mold to make the pad 20. The pad 20 is extracted from the cavity (See FIG. 2). The pad 20 is integrated with the cushion frame 2a. The pad 20 includes foamed beads contacting each other like styrene foam. A cushion pad (not shown in the FIGS.) is mounted so as to enwrap the pad 20. The surface of the cushion pad is covered with a cushion cover (not shown in the FIGS.).

As shown in FIG. 1, a panel 16 is mounted to the cushion frame 2a so as to bridge the front frame 10 and the rear frame 12. A hook (not shown in the FIGS.) is mounted to the panel 16. The hook can be hooked over a striker (not shown in the FIGS.) fixed to a vehicle floor (not shown in the FIGS.).

When not in the tip-up mode, an occupant can sit on the seat cushion 2. In this state, it is possible to hook the hook over the striker. This makes it possible to maintain a state in which the seat cushion may be used. When the hook is rotated to release the hook from the striker, the seat cushion 2 can be flipped up so as to be parallel and/or in contact with the seatback 3. As a result, the rear seat 1 is placed in the tip-up mode.

Figure 3:
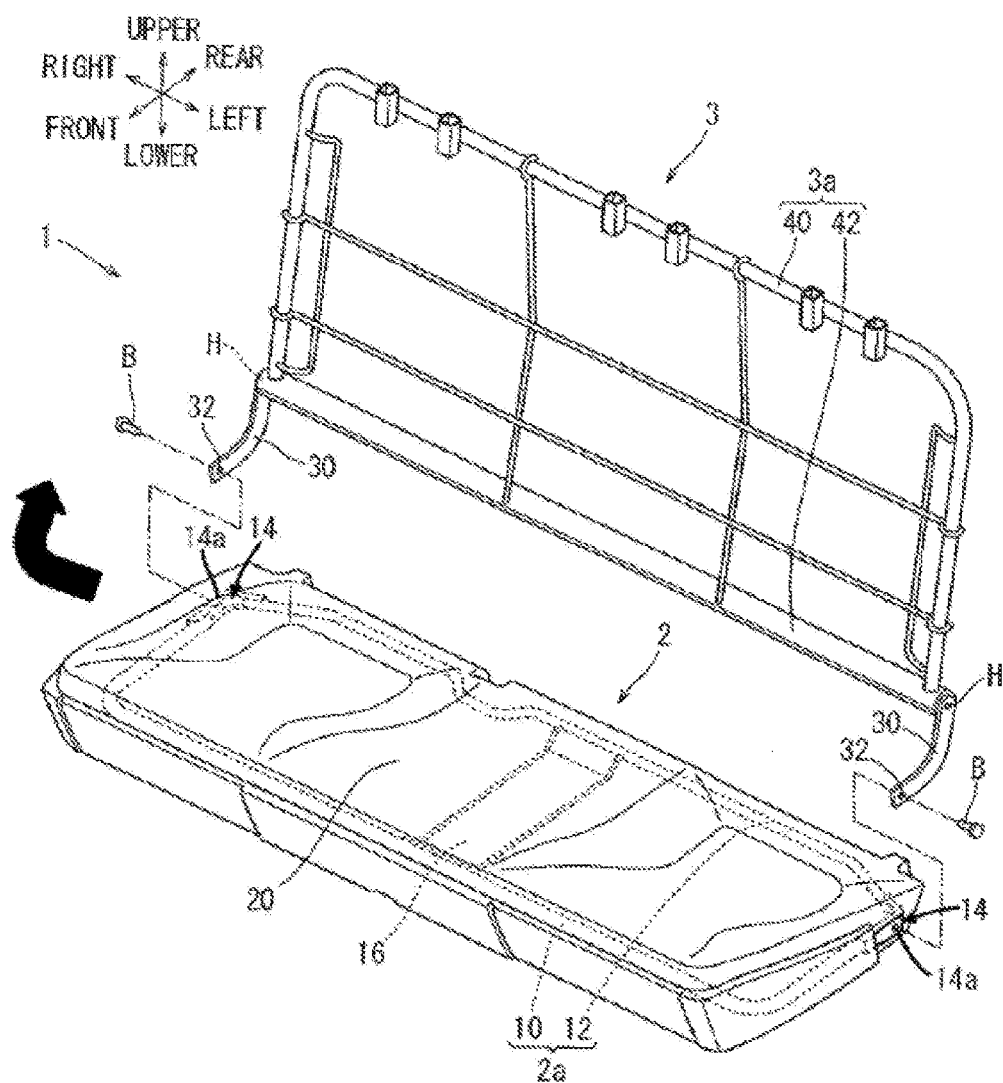
FIG. 3 is an exploded view for showing an assembly of a back frame and a cushion frame of FIG. 2.

As shown in FIG. 3, the seatback 3 has a back frame 3a, a back pad (not shown in the FIGS.), and a back cover (not shown in the FIGS.). The back frame 3a constitutes a framework of the seatback 3. The back pad is mounted so as to engulf the back frame 3a. The back cover covers a surface of the back pad.

When manufacturing the seatback 3, the back frame 3a is formed first. The back frame 3a has a substantially U-shaped upper frame 40, and a lower frame 42 that spans across the lengthwise distance of the upper frame 40. The ends of the upper frame 40 and ends of the lower frame 42 are bonded to each other.

Next, the back pad is mounted to the back frame 3a so as to engulf the back frame 3a. A surface of the back pad is covered with the back cover.

As shown in FIG. 3, the bracket 30 has a curved shape or bent shape, i.e., similar to a boomerang. Formed at one end of each bracket 30 is a mounting hole 32. The other end of each bracket 30 is mounted to an end portion of the lower frame 42. As a result, each bracket 30 constitutes a component of a hinge H.

FIG. 3 shows an inner structure of the seat cushion 2 and the seatback 3. In FIG. 3, the cushion pad, the cushion cover, the back pad, and the back cover are omitted. As shown in FIG. 3, when assembling the rear seat 1, each end of the lower frame 42 and each end of each bracket 30 are rotatably connected to each other by each hinge H. Bolts B are inserted into the mounting holes 32 and the mounting holes 14a. As a result, the brackets 30 and the connection members 14 are connected to each other. The brackets 30 are fixed to the rear frame 12 via the connection members 14.

The seat cushion 2 and the seatback 3 are connected to each other so as to be rotatable with respect to each other around the hinges H. The rear seat 1 is mounted to the vehicle seat (not shown in the FIGS.). The seat cushion 2 is flipped up so as to overlap the seatback 3. As a result, the rear seat 1 is placed in the tip-up mode.

As described above, the rear seat 1 has the brackets 30 adjusting the position of the seat cushion 2 relative to the seatback 3, i.e., to place the rear seat 1 in the tip-up mode. The brackets 30 have a curved shape in a boomerang-like fashion, and are separate from the cushion frame 2a. The pad 20 engulfs the cushion frame 2a. The cushion frame 2a has connection members 14 each having the mounting hole 14a. The bolts B are inserted into the mounting holes 14a of the connection members 14 and the mounting holes 32 of the brackets 30. The brackets 30 and the connection members 14 are connected to each other by the bolts B. The pad 20 is formed through foaming in the mold, and is integrated with the cushion frame 2a. After the forming of the pad 20, the brackets 30 are mounted to the cushion frame 2a. Thus, there is no need for the mold to be of a size taking the brackets 30 into consideration. This means that the mold can be reduced in size.

The cushion frame 2a is rotatably connected to the end portions of the lower frame 42 of the back frame 3a via the brackets 30. Thus, the rear seat 1 can be adjusted to the tip-up mode.

The cushion frame 2a is formed so as not to protrude from the pad 20 after foaming. Thus, no hard object is exposed to the outside of the pad 20. Thus, when seated, the user doesn't feel anything unpleasant.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be further modified, for example, as described below.

The vehicle seat may be the rear seat 1 of the automobile. Alternatively, the vehicle seat may be a driver's seat, a passenger seat adjacent to the driver's seat, etc. of the automobile. As described above, the vehicle may be an automobile. Alternatively, the vehicle, for example, may be a railroad car, an airplane, or a ship.

The seat 1 may have the pad 20 as the pad, or a cushion pad as the pad. That is, the seat cushion 2 may have the cushion frame 2a, the cushion pad (not shown in the FIGS.) formed through foaming, and/or through some other fabrication technique, attached to and/or integrated with the cushion frame 2a, and a cushion cover (not shown in the FIGS.) covering a surface of the cushion pad.

As described above, the seat cushion 2 may have the pad 20 formed through foaming so as to be integrated with the cushion frame 2a. Instead of or in addition to this, the seatback 3 may have a body of foamed beads formed through foaming so as to be integrated with the back frame 3a.

Figure 4:
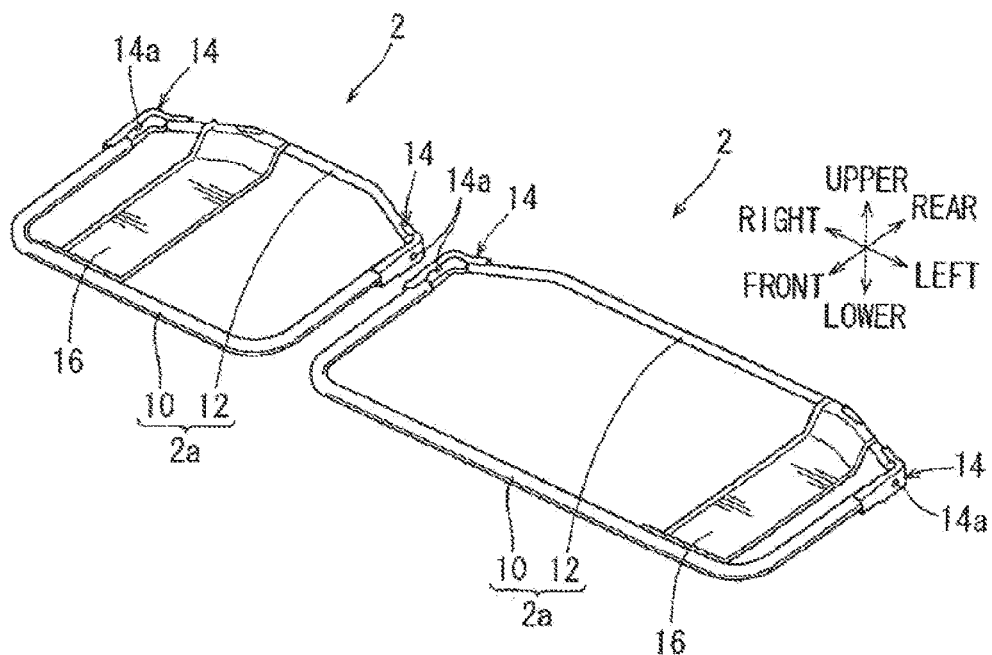
FIG. 4 is a perspective view of a cushion frame with another configuration.
Figure 5:
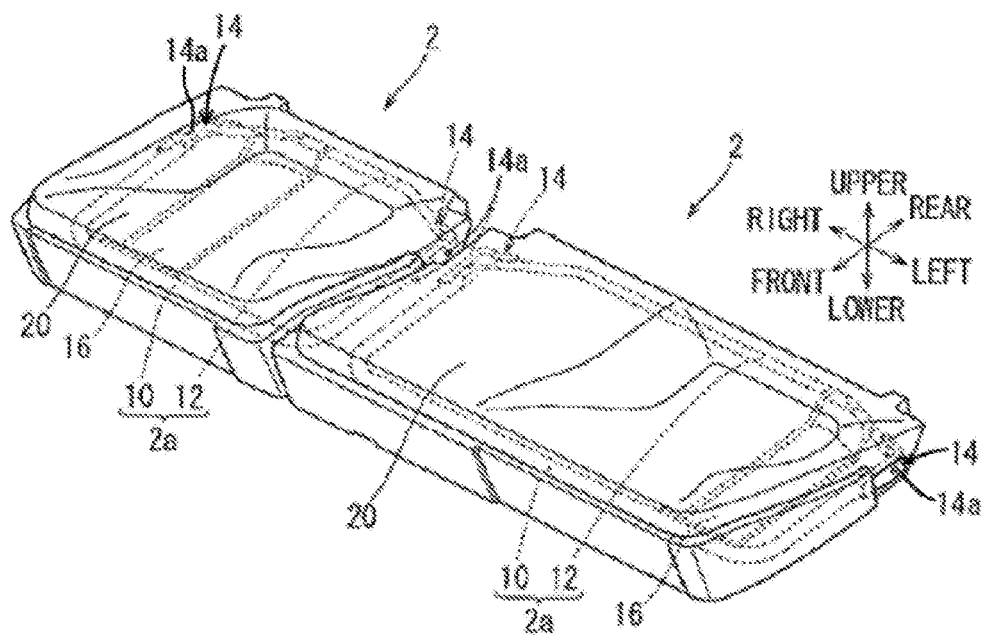
FIG. 5 is a perspective view of a seat cushion having a body of foamed beads integrated with the cushion of FIG. 4.
Figure 6:
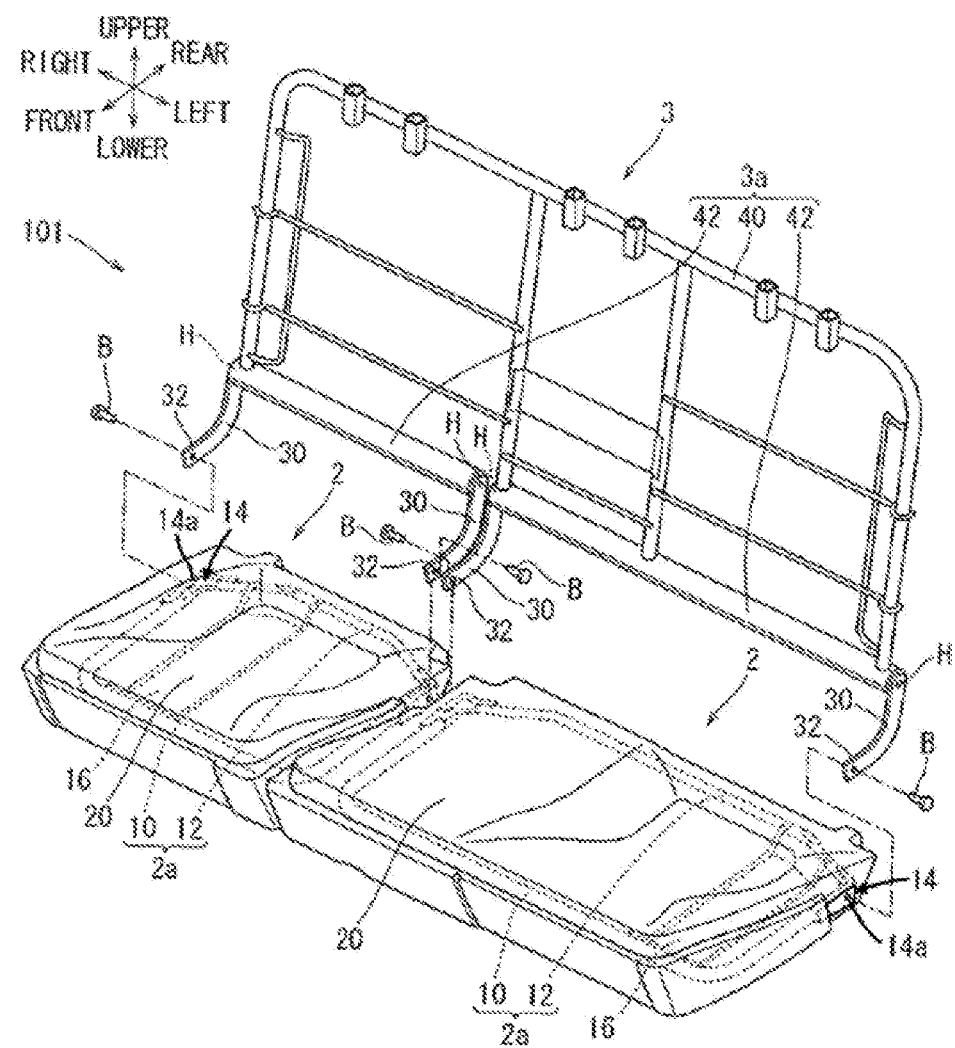
FIG. 6 is an exploded view for showing an assembly of a back frame and a cushion frame of FIG. 5.
Figure 7:
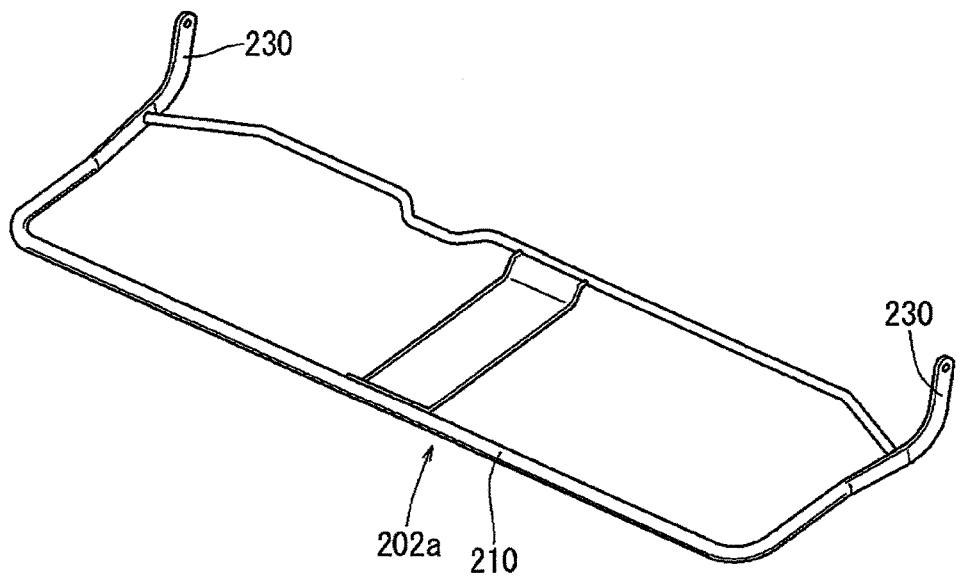
FIG. 7 is a perspective view of a cushion frame in the prior art.
Figure 8:
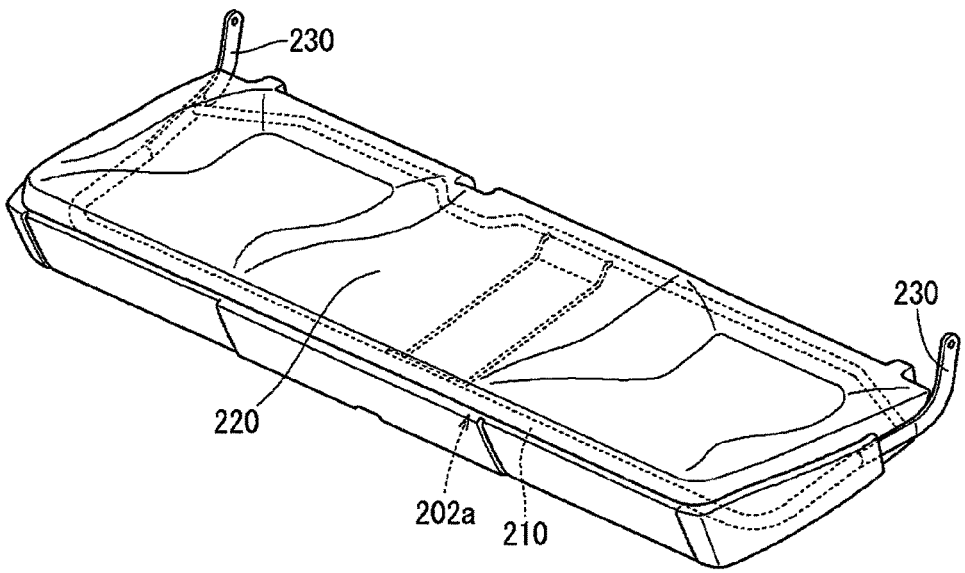
FIG. 8 is a perspective view of a seat cushion having a body of foamed beads integrated with the cushion of FIG. 7.
Figure 9:
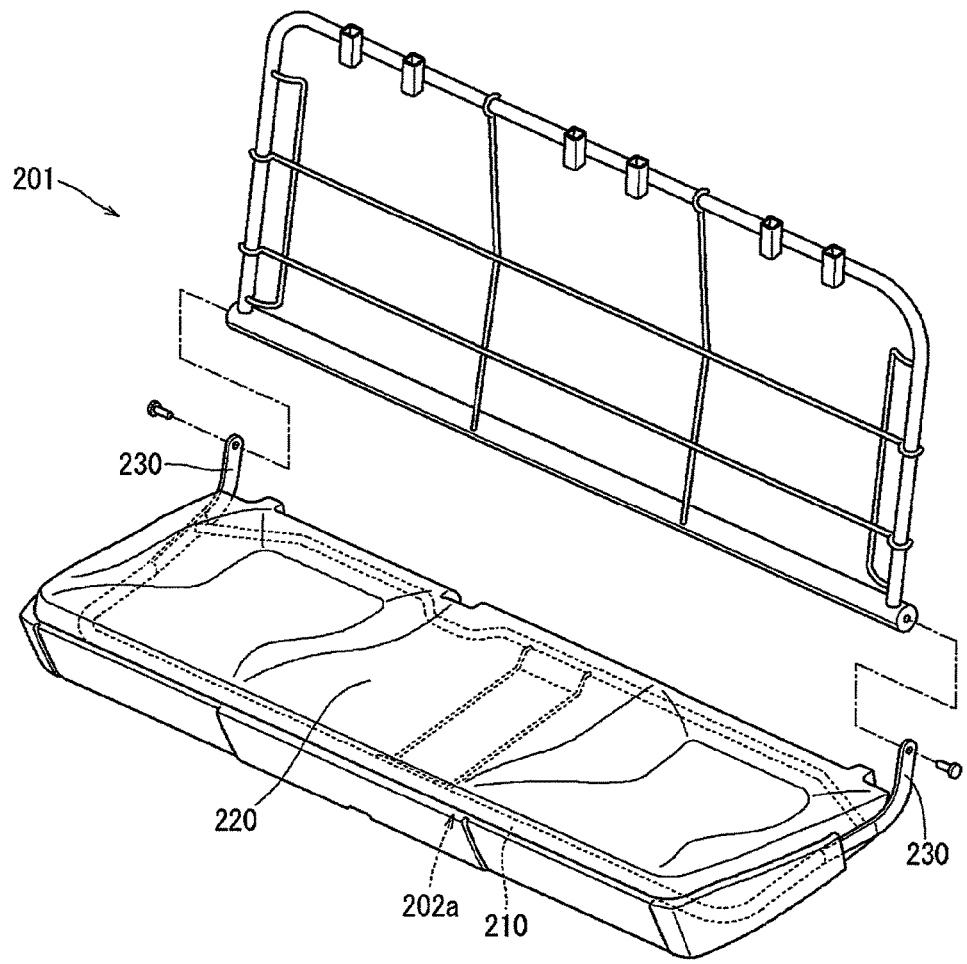
FIG. 9 is an exploded view for showing an assembly of a back frame and a cushion frame of FIG. 8.

As described above, the rear seat 1 may have a seat cushion 2 formed generally as a single piece, i.e., without multiple interior separate sub-sections. Alternatively, as shown in FIGS. 4 to 6, a rear seat 101 may be formed with another embodiment of the seat cushion, where the seat cushion 2 is divided in a width-wise direction at a proportion of 6:4. The rear seat 101 can provide the same effect as that of the rear seat 1.

As described above, the bracket 30 may be mounted to the rear frame 12 by a bolt B. Alternatively the bracket 30 may be mounted to the rear frame 12 by a different attaching device. The other attaching device may be a pin, a rivet, caulked member, etc.

What is claimed is:

1. A vehicle seat comprising:
   a seat frame;
   a pad integrated with the seat frame, wherein the pad is a foam that covers the seat frame; and
   a bracket for adjusting a seat mode of the vehicle seat, wherein the seat frame does not protrude from the pad, wherein the seat frame includes a connection member, at least a portion of which is not covered by the pad and is therefore exposed, and
   wherein the bracket is mounted to the connection member of the seat frame.

2. The vehicle seat of claim 1, wherein the at least a portion of the connection member has a mounting hole.

3. The vehicle seat of claim 2, wherein the bracket is coupled with the connection member by a bolt inserted into the mounting hole.

4. The vehicle seat of claim 1, wherein the bracket is coupled with the connection member by an attaching device.

5. The vehicle seat of claim 1, wherein the bracket protrudes from the pad.

6. The vehicle seat of claim 1, wherein the bracket has a curved shape.

7. The vehicle seat of claim 1, wherein the bracket is coupled with the seat frame by an attaching device.

8. The vehicle seat of claim 1,
   wherein the vehicle seat has a seat cushion and a seat back, the seat cushion being defined by the seat frame and the pad,
   wherein the seat frame is a cushion frame of the seat cushion,
   wherein the bracket is rotatably connected to a back frame of the seat back, and
   wherein the seat cushion is configured to be flipped up so as to overlap the seat back.

9. The vehicle seat of claim 1, further comprising:
   a seat cushion defined by the seat frame and the pad; and
   a seat back coupled to the seat cushion and extending outwardly therefrom,
   wherein adjustment of the bracket tilts the seat cushion relative to the seatback such that the seat cushion is substantially parallel to and in contact with the seat back, and
   wherein the bracket is rotatably connected to the seat back.

10. A vehicle seat comprising:
    a seat frame wherein the seat frame has a connection member;
    a pad coupled with the seat frame, wherein the pad is a foam covering at least a portion of the seat frame while leaving at least a portion of the connection member uncovered and further wherein the seat frame does not protrude from the pad; and
    a bracket coupled with the seat frame wherein the bracket is configured to allow adjustment of a seat mode of the vehicle seat.

11. A vehicle seat comprising:
    a seat frame;
    a pad integrated with the seat frame, wherein the pad is a foam that covers the seat frame; and
    a bracket for adjusting a seat mode of the vehicle seat, wherein the seat frame includes a connection member having a mounting hole, wherein the seat frame does not protrude from the pad, wherein the pad includes a hole to expose the mounting hole, and wherein the bracket is inserted through the hole into the pad to be mounted to a mounting portion around the mounting hole of the connection member.

\* \* \* \* \*